June 23, 1931. A. D. DU BOIS 1,811,541

METHOD AND MEANS FOR MEASURING AND RECORDING APPARENT POWER

Filed July 26, 1927

Witnesses
H. F. Janssen
Juanita Agnew

Inventor
ALEXANDER DAWES DU BOIS
by Atty. N. Du Bois

Patented June 23, 1931

1,811,541

UNITED STATES PATENT OFFICE

ALEXANDER DAWES DU BOIS, OF MINNEAPOLIS, MINNESOTA

METHOD AND MEANS FOR MEASURING AND RECORDING APPARENT POWER

Application filed July 26, 1927. Serial No. 208,530.

This invention relates in general to a method of combining the separate, simultaneous, indications of any two measuring instruments, in a manner to indicate and record the arithmetical product of the separately measured quantities. The method, and the means for executing the method, are applicable to separately measurable quantities of any nature, such as height and width, force and velocity, etc.; but the invention is herein described as applied more particularly to the quantities, electric pressure and electric current, for the purpose of indicating and recording their arithmetical product which is known as apparent power. This particular application of the invention is chosen, for the following explanation, in order to avoid unnecessary complication and because it is an application for which a well known need exists in industry.

The purpose of the invention is to provide a method of indicating and recording, without calculation or complication, the successive instantaneous products of any two measurable quantities which may be physically related; and especially to provide direct indications, and continuous records, of apparent power in alternating-current electric circuits under varying conditions of load and power-factor.

I accomplish this purpose as hereinafter described, and illustrated in the accompanying drawings to which reference is hereby made, and in which.

Similar reference letters and numerals designate like parts in the several views.

It is well known, to persons acquainted with that branch of mathematics known as analytic geometry, that all rectangles which can be drawn between an equilateral hyperbola and its rectangular axes of coordinates have equal areas.

The rectangles here considered are those having one corner at the origin of coordinates and two adjacent sides coincident with the two axes of coordinates. The corner of each rectangle furthest removed from the origin, diagonally opposite thereto, will be referred to, for convenience, as the "remote corner".

Figure 1:
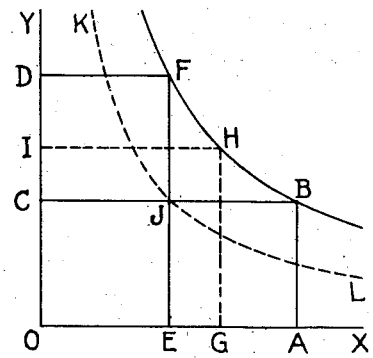
Fig. 1 is a diagram illustrating the geometrical relations employed in my invention.

For example, referring to Fig. 1, let the curve FHB be an hyperbola, referred to its asymptotes OX and OY as rectangular axes of coordinates. Any rectangle, such as OABC, having as its base an abscissa (OA) of some point B on the curve, and having as its altitude the ordinate (OC) of the same point, will have an area equal to the area of any other rectangle, such as OEFD, constructed with the abscissa and ordinate of some other point, F, of the curve. In Fig. 1, the rectangles OABC, OGHI and OEFD all have the same area. Conversely, all rectangles having the same area must have their remote corners upon the same hyperbola. If rectangles of some other area are drawn, all of the same area, the locus of their remote corners will be another hyperbola, as for example the curve KJL.

If, then, a vertical line, carried by a horizontally movable measuring element, be moved to such a position that its distance from the vertical axis OY is at all times proportional to the reading of a first measuring instrument; and if a horizontal line, carried by a vertically movable measuring element, be moved to such a position that its distance from the horizontal axis OX is at all times proportional to the reading of a second measuring instrument; the area of the rectangle formed by the two lines and the two axes of coordinates will be a measure of the product of the quantities measured by the two measuring instruments. If the area of the rectangle is known, this product must therefor be known. It is evident that the area of the rectangle will be known if its remote corner lies upon a known hyperbola; hence, if a family of known hyperbolas be drawn at sufficiently close intervals, the one which lies nearest to the corner of the rectangle will, with sufficient accuracy, indicate the area of the rectangle.

To apply this principle to the specific case of apparent power in an electric circuit, refer again to Fig. 1. Let the distance OA represent an electric pressure, measured in volts; and let the distance OC represent an electric current measured in amperes. Then the area OABC will represent the apparent power in volt-amperes. If the pressure should fall to half of the assumed value, and the current should simultaneously rise to double the assumed value, their product, i. e. the volt-amperes, will remain the same as before. The pressure will then be represented by OE and the current by OD, while the apparent-power in volt-amperes will be represented by the area of the new rectangle OEFD which is the same as the area of OABC. For any other voltage such as OG, there is a corresponding value of current, OI, which will give the same product, and the rectangle OGHI will have the same area as the two rectangles previously described. In a similar manner any number of rectangles of the same area can be drawn, having the locus of their remote corners in the curve FHB.

Hence, if the pressure and current should both change at the same time and in such a manner as to cause the remote corner of the rectangle to follow the hyperbolic curve FHB, it would indicate that the product of volts and amperes remains constant. Likewise, for any other hyperbola, belonging to the same family of curves, all positions of the remote corner which fell upon the stated curve would represent some constant area of rectangles, and therefore some constant value of volt-amperes. Each value of volt-amperes has its own hyperbolic curve.

Suppose the voltage to remain constant at the value OE (Fig. 1) while the current decreases from the value OD to half that value, namely OC; then the remote corner will move from F to J, and the new value of volt-amperes will be measured by the area OEJC which is half of the area OEFD. The point J is on a new hyperbola KJL, which is the locus of the remote corners of all possible rectangles having this new area. Thus, the hyperbola KJL represents half the value of apparent-power (volt-amperes) that is represented by the hyperbola FHB. If a family of hyperbolic curves be drawn at sufficiently close intervals, each curve will represent a definite value of volt-amperes, and it is only necessary to observe which one of the curves is in register with the remote corner of the rectangle representing pressure and current, to have a sufficiently close indication of the measurement of apparent power.

The mathematical explanation has been thus far restricted to the equilateral hyperbola referred to a rectangular system of coordinates, as that form of hyperbola is generally to be preferred, but the method which constitutes my invention is not so restricted. Hyperbolas of an oblique system, having asymptotes not at right angles, may be employed provided the displacements of the directive links used in the mechanism are made to follow paths parallel to the asymptotes. In that case the guides for the stylus will not be at right angles with each other. It will be observed that the essential characteristic of the curves is the equi-product property, whereby a given curve can represent a constant product of the two separately measured quantities. Hence, the term "equi-product curve", as used herein, is understood to mean any curve adapted to meet this essential requirement.

Figure 2:
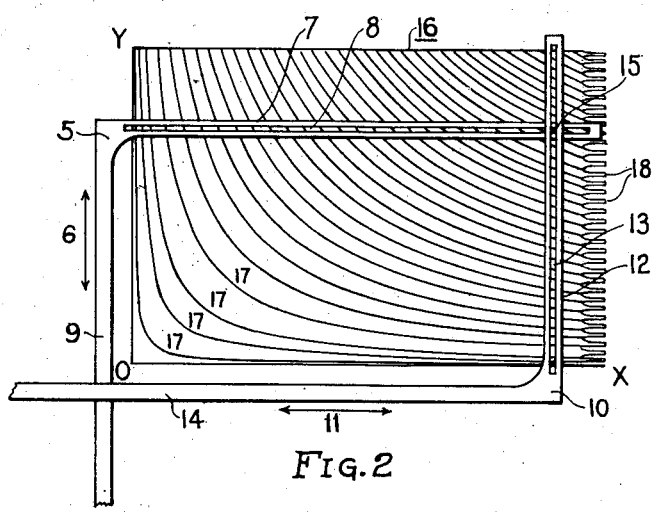
Fig. 2 is a diagram of a typical mechanism suitable to perform the steps of the method.

The geometric relations described above are utilized as the basis of my new method of measuring and recording apparent power, in conjunction with the deflections of voltmeters and ammeters of well known construction. A typical application of the method is as follows:

First. A family of hyperbolic curves is drawn to a suitable scale, on a plane surface or plate, as indicated in Fig. 2, and each curve is identified by its rank or a suitable designating number for reference in reading the results of the method;

Second. An index in the form of a straight line on a movable element, always parallel to the "Y" axis of the curves, is caused to take such successive positions on the plate that its distance from the "Y" axis is at all times proportional to volts as measured by a voltmeter;

Third. Another index consisting of a straight line on another movable element, always parallel to the "X" axis, is caused to take such successive positions on the plate that its distance from the "X" axis is at all times proportional to amperes as measured by an ammeter;

Fourth. As often as it may be desired to determine the apparent power, the hyperbolic curve which lies nearest to the point of intersection of the two straight lines is indicated and recorded; then the identifying number of this curve or its position in the family of curves, will denote the apparent-power. If the plate has been appropriately calibrated, the apparent-power will be indicated directly in volt-amperes;

Fifth. The process above described is continued as long as need be, to secure either an intermittent or an approximately continuous record of apparent power, during any period of time, as may be desired.

Having described the method, I will now describe means which can be used to perform, automatically, the steps involved in the method. Since the details of construction of the mechanism are incidental to the invention, the mechanism is shown only diagrammatically.

Typical form of mechanism

The two straight lines (prescribed to take successive positions) are carried upon two reference members which function as directive links in a mechanism for constraining and directing the movements of a contact point in its relation to the curves. Referring to Fig. 2, which is a diagrammatic representation of a typical form of mechanism, let the part 5 represent a directive link in the form of a slider adapted to travel in the directions indicated by arrows 6, and let this slider be operatively connected to the moving element of an ammeter, so that the rectilinear displacement of the slider will be proportional to the current measured by the ammeter. Let the part 10 represent a second directive link in the form of a slider adapted to travel in the directions indicated by arrows 11 (at right angles to the motion of slider 5), and let this slider be operatively connected to the movable element of a voltmeter, so that the rectilinear displacement of the slider is directly proportional to the electric pressure measured by the voltmeter. The ammeter and voltmeter, being of standard construction, are not shown.

Let each slider be provided with a suitable way, such as a slot, parallel to the path of travel of the other slider; and let a slidable follower element be inserted at the intersection of the two slots as indicated at 15. The follower element is free to slide in both of the slots 8 and 13, but, because the slots are at right angles, the follower is constrained to follow the point of intersection of the slots or ways for all positions of the sliders. The follower element is provided with a projection having a rounded point which will be referred to as the "stylus" or contact element. The stylus is adapted to slide upon the surface of a platen 16 to be hereafter described.

The operation of the directive mechanism is briefly as follows: Whenever an increase of current causes the ammeter to increase its deflection, the slotted member 7 of the directive link 5 is moved away from the member 14 of the directive link 10. In like manner, whenever an increase of pressure causes the voltmeter to increase its deflection, the slotted member 12 of the directive link 10 is moved away from the member 9 of the directive link 5. With a decrease of either the current or the pressure, the motions are in the reversed directions.

The area of the rectangle, of which the stylus 15 is the remote corner, is obviously proportional to the product of width and length; but the width, in direction 6, is directly proportional to the current measured by the ammeter; and the length, in direction 11, is directly proportional to the pressure measured by the voltmeter. The area of the rectangle is therefore directly proportional to the product of volts and amperes, and is a measure of the apparent power.

If the pressure remains constant while the current varies, the stylus 15 will travel parallel to the arrows 6. If the current remains constant while the pressure varies, the stylus 15 will travel parallel to the arrows 11. If the current and pressure vary simultaneously, the stylus 15 will move in a diagonal direction.

Let the family of hyperbolic curves, previously described, be embodied in the form of a plate of platen 16, consisting of a base of insulating material carrying a large number of metal strips, 17, each strip being insulated from the next by a curved strip of insulation following the form of an hyperbola. The insulation separating the metal strips is represented by the curved black lines in Fig. 2. The number of conductive strips required in the platen depends upon the degree of accuracy desired in the readings. A very large number can be economically formed, in a platen of convenient dimensions, by employing a photo-chemical method of manufacture. The completed platen is polished to provide a smooth surface for the movements of the contact stylus. The platen is so placed, with relation to the directive links that the stylus 15 at the intersection of the two slots will coincide with the origin of coordinates, O, of the family of hyperbolic curves, when the ammeter and voltmeter register zero. The straight lines OY and OX on the platen are the asymptotes of the curves, and are respectively parallel with the directions of motions 6 and 11. The motion of the stylus is essentially a relative motion as between the stylus and the family of curves; distortions of the paths of motion can therefore be compensated by distorting the hyperbolic curves.

Each of the curved conductive strips 17 is electrically connected to a suitable indicating or recording device which may consist of electro-chemical, electro-thermal, electro-magnetic or other electrically actuated means for giving an indication or making a record of the location of the strip beneath the stylus at each instant of time. In the embodiment chosen to illustrate the recording means, in Figs. 2 and 3, each of the conductive strips 17 terminates in a flexible finger 18 which bears upon a paper chart or record sheet 19. Obviously the fingers 18 may be remote from the platen 16, if desired, each finger being connected to the corresponding platen strip by means of a wire. The chart 19, which is supported by a conducting block 22, is wound on drums 20, 21, and may be driven at suitable speed by any means such as the clock mechanism commonly used with recording instruments of well known construction.

Figure 3:
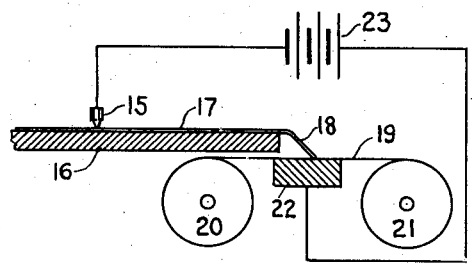
Fig. 3 is a diagrammatic side elevation of a portion of the typical mechanism showing the platen in operative relation with a recording chart.

The paper 19 is chemically treated, by any suitable known process, such that the passage of electricity will cause discoloration. The stylus 15 is electrically connected to one terminal of a suitable source of electromotive force 23. The other terminal of the source of electromotive force is connected to the supporting block 22, as indicated in Fig. 3. In this manner an electric circuit is established from one electrical terminal, through the block 22, the chemically treated chart 19, one of the fingers 18, the corresponding platen strip 17 and the stylus 15, to the electrical terminal of opposite polarity. A mark is thereby made upon the chart 19 by the electrolytic action which takes place at that one of the fingers (18) which is electrically energized. The only finger that is energized at any given moment is the one attached to the platen strip which makes contact with the movable stylus 15. Whenever the stylus moves from one platen strip to another, it thereby energizes another finger.

In this manner, only one of the many fingers 18 will register a mark or dot on the paper at any one time. As the stylus 15 moves about on the platen, due to the changes of current measured by the ammeter or changes of voltage measured by the voltmeter, a dotted or broken line is made by the fingers 18, upon the moving chart 19; this forms on the chart a continuous record showing which of the platen strips was in contact with the stylus 15 at each instant of time. The result is a graph, pleated to rectangular coordinates, with volt-amperes as ordinates and time as abscissæ. The paper chart is ruled in the usual manner, and can be so calibrated that volt-amperes, or kilovolt-amperes, can be read directly from the chart.

When it is desired to make use of the invention as a demand meter, to record only the maximum demand in volt-amperes, the chart may be stationary and no clock mechanism is required. The record on the chart is then a straight line the length of which is a measure of the volt-ampere maximum demand. The strip of paper or other recording substance can be either renewed or moved by hand to a new position when the readings are taken at the close of each billing period.

Alternative forms of mechanism

It is obvious that various forms of operating and recording mechanism may be used within the scope of my invention. The most desirable form of directive links is a matter of engineering design. The form shown in Fig. 2 is merely diagrammatic, having been chosen for clearness of illustration and explanation. The rectilinear paths of motion and the rectangular relation illustrated in the drawings likewise contribute to simplicity; but equi-product curves can be plotted to correspond to curvilinear paths of motion and non-rectangular relations. The exact form of the curved strips in the platen must be determined by the exact paths of motion of the directive links. If the directive links are to be controlled by measuring instruments having non-uniform-scale charactersitics, this condition can of course be compensated by such well known mechanical expedients as non-circular or eccentric gears; but the compensation can be made equally well in the platen by modifying the form of the curves. Obviously the surface of the platen is not necessarily flat, since the essential result could be obtained with a curved platen. The invention is not limited to the electrochemical method of marking the chart herein described. Any suitable means may be employed, either for indicating or for recording the relative location of the platen-strip with which the stylus makes contact at each successive instant.

Having fully described my invention, what I claim as new and desire to secure by Letters Patent is:

1. The method of continuously deriving and recording the successive instantaneous products of two separately measurable, variable, physical quantities, with a pair of reference members and a surface marked with a family of known hyperbolas, which comprises: causing the first reference member to respond to all changes of the first measurable quantity with proportionate motion relative to the hyperbolas in a path parallel to one asymptote thereof; simultaneously causing the second reference member to respond to all changes of the second measurable quantity, with proportionate motion relative to the hyperbolas, in a path parallel to the other asymptote thereof, whereby the relative position of a point common to said reference members in relation to the hyperbolas on said marked surface designates the product of the measured variable quantities; and recording said relative position, in terms of a derived quantity having the physical dimensions of said product.

2. The method of measuring volt-amperes, by the aid of a contact element and a surface inscribed with a family of known curves substantially in the form of hyperbolas, which consists in: giving motion to the contact element in both dimensions of the surface so that one component of said motion is in the dimension parallel to one asymptote of the hyperbolas and is continuously responsive to the movements of a voltmeter element while the other component of said motion is in the dimension parallel to the other asymptote of the hyperbolas and is continuously responsive to the movements of an ampere-meter element; and ascertaining which one of the known hyperbolas is in register with or nearest to the contact element.

3. The method of deriving and recording successive instantaneous products of two variable physical quantities, as measured by separate measuring elements, which comprises: moving an electrically energized contact element in relation to a surface marked with a family of equi-product curves embodied in alternate linear elements of insulative material and conductive material, said motion being the resultant of two component motions, determined respectively by the two measuring elements; and recording which one of the linear elements of conductive material is electrically energized by the contact element at each instant of time.

4. The method of measuring apparent power which consists in: translating the movements of voltmeter and ammeter elements into separately directed motions of a pair of index elements in relation to a family of equi-product curves; moving an electrically energized element in correlation with both of said index elements; and noting the rank of a particular equi-product curve identified by said electrically energized element each moment that a measurement of apparent power is desired.

5. Means for measuring and recording successive instantaneous products of the values of two separately measurable quantities, in conjunction with a first measuring instrument for measuring one of said quantities and a second measuring instrument for measuring the other of said quantities; said means comprising:—a platen consisting of strips of conducting material separated by insulating material arranged in the form of a family of equi-product curves; a first movable element controlled by the first measuring instrument and constrained to movements parallel to one asymptote of the curves; a second movable element controlled by the second measuring instrument and constrained to movements parallel to the other asymptote of the curves; a stylus in operative relation with the movable elements and the platen; and means for denoting the relative location of that conductive strip which makes contact with the stylus at any instant.

6. In conjunction with the moving element of an ammeter and the moving element of a voltmeter, the combination of; directive elements actuated by said moving elements of ammeter and voltmeter; a platen consisting of strips of conductive material, separated by insulative material, arranged substantially in the form of a family of hyperbolic curves; a stylus, movable jointly by said directive elements, in contact with said platen; and means for indicating which one of the conductive strips is in contact with the stylus at any given time.

7. Means for recording successive instantaneous products of two variable quantities as measured by first and second measuring elements, comprising: a first directive element controlled by the first measuring element; a second directive element controlled by the second measuring element; a platen of alternate strips of conductive material and insulative material in the form of equi-product curves; a stylus in operative relation with the directive elements and the equi-product curves; a chart adapted to receive marks by electrical action; a plurality of fingers connected to the equi-product conductive strips and adapted to mark said chart when energized; and electrical means for selectively energizing said conductive strips through said stylus.

8. In an instrument of the class described, the combination of: a pair of directive links carrying an electrical contact stylus; a platen comprising a number of conductors arranged in the form of equi-product curves; a record sheet; marking means adapted to make a record on said record sheet; and local electric circuits, including the conductors of the platen, whereby to selectively energize said marking means.

9. A recorder comprising: a record sheet; electro-responsive means for marking said record sheet; a family of equi-product curves embodied in strips of conductive material in operative relation with said electro-responsive means; members movable in angular relation to each other; and a contact element cooperating with said members and said strips.

10. A multiplying and recording instrument, comprising: members movable in angular relation to each other; a contact element cooperating with said members; an assemblage of linear elements having the form of equi-product curves in operative relation with said contact element; a movable chart and means for marking the chart in response to the contacts of said contact element with said linear elements, whereby to record in a substantially continuous graph the successive instantaneous products of quantities denoted by the positions of the said members.

11. In an instrument of the class described, the combination of: a pair of directive links differentially operative in response to two measuring elements; an electrically energized contact element responsive to said links; and an assemblage of alternate conductive and insulative linear elements in the form of equi-product curves in operative relation with said contact element.

12. In an instrument of the class described, an assemblage of linear elements of conductive material in the form of equi-product curves, and means for selectively energizing said linear elements.

13. A platen for measuring instruments, comprising: an assemblage of linear elements of conductive material separated by linear elements of insulative material, in the form of equi-product curves.

In witness whereof, I have hereunto signed my name at Springfield, Illinois, this 23d day of July, 1927.

ALEXANDER DAWES DU BOIS.